United States Patent [19]

Abele et al.

[11] Patent Number: 5,219,976

[45] Date of Patent: Jun. 15, 1993

[54] PROCESS FOR THE PREPARATION OF PHENOL RESINS USING BY-PRODUCTS OF THE CHLORINATION OF BUTADIENE AS REACTANTS

[75] Inventors: Manfred Abele, Colonge; Hans-Josef Buysch, Krefeld; Heinrich Schrage, Krefeld; Hugo Vernaleken, Krefeld, all of Fed. Rep. of Germany

[73] Assignee: Bayer Aktiengesellschaft, Leverkusen-Bayerwerk, Fed. Rep. of Germany

[21] Appl. No.: 655,769

[22] Filed: Feb. 15, 1991

[30] Foreign Application Priority Data

Feb. 27, 1990 [DE] Fed. Rep. of Germany ....... 4006130

[51] Int. Cl.$^5$ .................... C04G 14/04; C08G 65/38
[52] U.S. Cl. ..................... 528/86; 528/159; 528/205; 528/212; 528/214; 528/217; 528/219; 525/132; 525/139; 525/144

[58] Field of Search ........ 525/139, 132, 144; 528/212, 205, 159, 86, 214, 217, 219

[56] References Cited

U.S. PATENT DOCUMENTS

| 3,644,537 | 2/1972 | Dannels et al. | |
|---|---|---|---|
| 3,878,278 | 4/1975 | Miller et al. | 521/100 |
| 3,972,959 | 8/1976 | Koyama | 525/429 |
| 3,980,727 | 9/1976 | Yokokawa et al. | 528/217 |
| 4,110,311 | 8/1978 | Cooper et al. | 528/217 |
| 4,378,450 | 3/1983 | Ema et al. | 525/132 |
| 4,435,543 | 3/1984 | Ema et al. | 525/132 |
| 4,483,962 | 11/1984 | Sadowski | 526/292.8 |
| 4,486,576 | 12/1984 | Colon et al. | 528/214 |
| 4,711,911 | 12/1987 | Blount | 528/217 |

Primary Examiner—John Kight, III
Assistant Examiner—John M. Cooney, Jr.
Attorney, Agent, or Firm—Connolly & Hutz

[57] ABSTRACT

By-products from the chlorination of butadiene may be reacted with phenols in the presence of iron catalysts to form Novolak type phenol resins.

3 Claims, No Drawings

PROCESS FOR THE PREPARATION OF PHENOL RESINS USING BY-PRODUCTS OF THE CHLORINATION OF BUTADIENE AS REACTANTS

This invention relates to a process for the preparation of Novolak-type phenol resins of phenols with mixtures of at least partially chloro substituted $C_4$ to $C_8$ hydrocarbons in the presence of iron catalysts.

Novolaks, as is well known, are fusible, non-self curing polyphenols which are soluble in numerous organic solvents and in which the aromatic nuclei are linked by alkylidene groups. They may be prepared from phenols and keto compounds in the presence of acid catalysts. This method is normally carried out with a molar ratio of keto compounds to phenol of at most 1, preferably not more than 0.75; see "Methoden der Organischen Chemie" (Houben-Weyl), volume 14/2, Georg Thieme Verlag, Stuttgart 1963, page 193 et seq.

The term "Novolak type phenol resins" is used in the context of this invention to denote phenol resins in which the linking members are not limited to alkylidene groups but which are substantially free from groups capable of self cross-linking, in other words they are in the main free from hydroxymethyl groups.

During the preparation of chloroprene by the chlorination of butadiene undesirable by-products having 4 to 8, generally 4 or 8 carbon atoms and at least 3, generally at least 4 functional groups from the series consisting of chlorine atoms and $C=C$ double bonds are formed. Typical by-products consist of mixtures of 20 to 60% by weight of 1,2,3,4-tetrachlorobutane, 10 to 60% by weight of dichlorooctadienes, 3 to 20% by weight of trichlorobutenes, 2 to 8% by weight of tetrachlorooctenes and up to 15% by weight of dichlorobutenes, dichlorobutanes and hexachlorooctanes. The individual components cannot be clearly separated from these mixtures by distillation as their boiling points are close together. For this reason, the by-products have not hitherto been uitilized but burnt.

It was therefore an object of the present invention to avoid the economically and ecologically undesirable burning of these by-products and convert all the components of the by-product mixtures into more valuable products.

It has now surprisingly been found that iron catalysts are eminently suitable for a reaction of the above described by-products with phenols since, as far as can be ascertained, they catalyse the reaction of each by-product component, including that of the less reactive tetrachlorobutane, so that when the excess phenol and, if present, solvent have been separated off, the phenol resin obtained can be worked up further without elaborate processes of purification and without regard to its heterogeneous units, for example to produce reinforcing components in rubber compositions which are to be vulcanized.

Although the reaction of unsaturated hydrocarbons with phenols to produce phenol resins had already been disclosed in U.S. Pat. No. 3,644,537, the reaction described there did not entail the problem of reacting mixtures of different components and the use of iron catalysts was not mentioned at all.

The present invention thus relates to a process for the preparation of Novolak type phenol resins by the reaction of A) phenols with B) mixtures of at least partially chlorine substituted $C_4$ to $C_8$ hydrocarbons in the presence of iron catalysts.

The preferred phenols A for the process according to the invention include both monovalent and divalent mononuclear phenols which have no substituents other than the phenolic hydroxyl groups. Examples of such phenols include phenol itself, pyrocatecol, resorcinol, hydroquinone, monovalent $C_1$ to $C_6$ alkylphenols such as cresols, xylenols, ethylphenols and hexylphenols, monovalent phenylphenols such as hydroxybiphenyls, and mononuclear and dinuclear $C_6$ to $C_{18}$ bisphenols such as dihydroxybiphenyls, bis-(4-hydroxyphenyl)-methane, 2,2-bis-(4-hydroxyphenyl)-propane and bis-(4-hydroxyphenyl)-sulphide.

The chlorine content of the mixtures B generally amounts to 40 to 70% by weight, preferably 45 to 60% by weight, based on the mixture B.

For the process according to the invention, the starting materials are generally used in quantities corresponding to an equivalent ratio of phenolic OH groups to functional groups of the by-product components (chlorine or $C=C$ double bond) of from 1:10 to 10:1, preferably from 1:4 to 8:1, in particular from 1:2 to 5:1.

Preferred iron catalysts include metallic iron and compounds of iron, preferably of divalent and trivalent iron, e.g. the bromides, nitrates, sulphates, oxalates and in particular chlorides. The quantity of catalyst is generally from 0.05 to 10% by weight, preferably from 0.1 to 3% by weight, based on the mixtures of hydrocarbons B.

The process according to the invention is preferably carried out in the absence of solvents although organic solvents which are inert under the reaction conditions may well be used, preferably those boiling at temperatures above 120° C., in particular above 180° C., such as nitrobenzene, dichlorobenzene, benzonitrile or chloronaphthalene. If the process is to be carried out in solution, the organic solvent is used in quantities from 5 to 100% by weight, based on the sum of phenol A and mixture B.

The process according to the invention is exothermic and can therefore proceed without the supply of external heat once it has started. In order to ensure as complete a reaction and hence as low a chlorine content in the end product as possible, it may be advisable to leave the reaction mixture at temperatures from 40° to 280° C., preferably 80° to 250° C., in particular 120° to 200° C., for 2 to 20 hours after all the components have been added together. Termination of the reaction can be recognised by the cessation of evolution of hydrogen chloride.

In practice, the process according to the invention may be carried out by introducing the molten phenol A and catalyst into the reaction vessel and adding mixture B in the calculated quantity, optionally as a solution in an organic solvent. The reaction mixture may be stirred to ensure thorough mixing of the components. After completion of the reaction, the solvent (if present) and excess phenol may be removed, preferably by distillation, optionally at reduced pressure. The distillate thus obtained may be reused for further reactions.

The phenol resins prepared according to the invention contain from 0.2 to 1, preferably from 0.4 to 0.8 mol of units derived from mixture B per mol of unit derived from phenol A.

The phenol resins prepared according to the invention generally have softening points (according to DIN 53 244) of from 50° to 200° C., OH numbers from 100 to 550 and number average molecular weights Mn of from 250 to 2000 (determined by vapour pressure osmometry in methanol and in acetone, the lower value being taken as the correct value).

The phenol resins prepared according to the invention are suitable for use as reinforcing resin components for rubber compositions which are to be vulcanized. These rubber compositions may be based on natural and synthetic rubbers.

Preferred synthetic rubbers are described, for example, in Kautschuk-Technologie by W. Hofmann, Gentner Verlag, Stuttgart 1980 and include inter alia

| | |
|---|---|
| BR | polybutadiene |
| ABR | butadiene/acrylic acid-$C_1$ to $C_4$ alkyl ester copolymers with acrylic ester contents of from 5 to 60% by weight, preferably from 15 to 50% by weight, |
| CR | polychloroprene |
| IR | polyisoprene |
| IIR | isobutylene/isoprene copolymers |
| SBR | styrene/butadiene copolymers with styrene contents from 1 to 60% by weight, preferably from 20 to 50% by weight, |
| NBR | butadiene/acrylonitrile copolymers with acrylonitrile contents from 5 to 60% by weight, preferably from 10 to 50% by weight, |
| EPDM | ethylene/propylene/diene copolymers | and mixtures of these rubbers. The rubbers to be used for the process according to the invention have glass transition temperatures below 20° C. preferably below 0° C., determined by the torsion vibration test according to DIN 53 445.

The amount of phenol resins added may be from 1 to 50% by weight, preferably from 3 to 15% by weight, based on the rubber.

Since the phenol resins prepared according to the invention are not self curing, they require to be cured, as do the Novolaks, by an addition of formaldehyde, compounds which split off formaldehyde, such as hexamethylene tetramine or melamine- or urea-condensates containing methylol groups. These curing agents are generally used in quantities of from 2.5 to 50% by weight, preferably from 5 to 15% by weight, based on the phenol resin. If the phenol resins are cured and the rubber surrounding them is vulcanized, it may be assumed that cross-linked systems consisting of so called interpenetrating networks are formed, provided that the phenol resin prepared according to the invention does not form part of the vulcanizing system required for the rubber.

The use of these resin systems in rubber compositions results in an improvement in some important mechanical properties of the resulting vulcanisates, such as, for example, the hardness and the tension values The reinforcing resins may be incorporated by means of the usual apparatus used for the production of rubber mixtures, such as internal mixers and rolling mills. If high mixing temperatures are employed (internal mixers), the reinforcing resin and the curing agents should be incorporated separately to avoid premature reactions in order that the vulcanisate obtained will be as hard as possible. In such cases, it is advisable to add the curing agent only towards the end of the preparation of the mixture and at as low a mixing temperature as possible (maximum about 100° C.).

The resins according to the invention may be used for the production of technical rubber goods such as rollers, seals and floor coverings.

The percentages given in the following examples are percentages by weight and parts are parts by weight.

EXAMPLES

The "product mixture" used in the following examples is a mixture of by-products from the chlorination of butadiene having a chlorine content of 54% and a C=C double bond content of 0.575 mol of double bonds per 100 g of product. The product mixture consisted of 35% of tetrachlorobutane, 40% of dichlorooctadienes, 7% of trichlorobutenes, 8% of tetrachlorooctenes and 10% of small amounts of other products.

EXAMPLE 1

200 g of product mixture were added dropwise to a melt of 400 g of phenol and 4 g of anhydrous iron chloride at 60° C. The temperature of the reaction mixture rose to about 80° C. The mixture was then heated to 182° C. for 6 hours and the excess phenol was distilled off. 250 g of phenol resin having a softening point of 105° C. and OH number 240 remained as residue.

EXAMPLE 2

200 g of product mixture were added dropwise to a melt of 460 g of cresol and 4 g of anhydrous iron chloride at 60° C. The reaction mixture heated up to about 80° C. It was then heated to 193° C. for 6 hours and the excess cresol was distilled off. 265 g of a phenol resin having a softening point of 110° C. and OH number 211 were obtained as residue.

EXAMPLE 3

200 g of product mixture were added dropwise to a melt of 470 g of resorcinol and 4 g of anhydrous iron chloride at 110° C. The reaction mixture was then heated to 200° C. for 6 hours and the excess resorcinol was distilled off. 405 g of phenol resin having a softening point of 65° C. and OH number 370 were obtained as residue.

EXAMPLE 4

200 g of product mixture were added dropwise at 140° C. to a melt of 500 g of bisphenol A and 4 g of anhydrous iron chloride. The reaction mixture was then heated to 200° C. for hours and the excess bisphenol was distilled off. 373 g of phenol resin having a softening point of 120° C. and OH number 220 were obtained as residue.

EXAMPLE 5

200 g of product mixture were added dropwise to a melt of 200 g of phenol and 2 g of anhydrous iron chloride at 6° C. The reaction mixture heated up to about 80° C. It was then heated to 182° C. for 6 hours and the excess phenol was distilled off. 215 g of phenol resin having a softening point of 130° C. and OH number 190 were obtained as residue.

Application

The following experiments serve to illustrate the use of the phenol resins prepared according to the invention as reinforcing resins for rubber compositions and their vulcanisates.

The following test mixture prepared in two stages was used for this purpose. The first stage of preparation of the mixture was carried out in an internal mixer (kneader). The following components were mixed (in parts):

| | |
|---|---|
| natural rubber (type SMR 5) | 75.0 |
| polybutadiene | 25.0 |
| stearic acid | 2.0 |
| zinc oxide | 5.0 |
| reinforcing resin (see Table) | 7.5 |
| carbon black N 326 | 70.0 |
| N-isopropyl-N'-phenyl-p-phenylene diamine (IPPD) | 1.5 |
| 2,2,4-trimethyl-1,2-dihydroquinoline, polymerised (TMQ) | 1.0 |
| | 187.0 |

The internal mixer was emptied after a mixing time of 5 minutes and mixing of the partly prepared mixture was then completed in a rolling mill, using the following formulation (in parts):

| | |
|---|---|
| partial mixture | 187.0 |
| sulphur | 2.5 |
| benzothiazyl-2-sulphene morpholide | 1.5 |
| N-cyclohexyl-thiophthalimide | 0.3 |
| hexamethylene tetramine | 0.76 |

Vulcanization of the completed mixtures was carried out at 150° C. for 30 minutes.

The following table shows the results of testing the vulcanisates. The results of the tests show that the resins prepared according to the invention have an excellent reinforcing effect.

| | Vulcanisates reinforced with various resins | | |
|---|---|---|---|
| Tests | Comparison 1 Vulcanisate free from reinforcing resin | Comparison 2 Commercial Novolak* | Resin from Example 1 |
| Ultimate tensile strength (MPa) | 19.4 | 16.2 | 16.5 |
| Elongation at break (%) | 332 | 300 | 370 |
| Tension at 100% elongation (MPa) | 4.4 | 5.7 | 5.2 |
| Hardness (Shore A) | | | |
| at 23° C. | 77 | 90 | 90 |
| at 70° C. | 72 | 87 | 87 |
| Recoil elasticity (%) determined at | | | |
| 23° C. | 43 | 40 | 40 |
| 70° C. | 53 | 46 | 43 |

*Phenol/formaldehyde condensate, ® Vulkadur RB of Bayer AG

We claim:

1. A process for the preparation of phenol resins by the reaction of A) phenols with B) by-products of the chlorination of butadiene, said byproducts consisting essentially of $C_4$ to $C_8$ hydrocarbons containing at least three functional groups selected from the group consisting of chlorine atoms and carbon-carbon double bonds, in the presence of iron (III) chloride catalysts.

2. A process according to claim 1 in which components A and B are used in an equivalent ratio of phenolic OH groups to functional groups in mixture B of from 1:10 to 10:1.

3. A process according to claim 1 in which the reaction temperature is from 40° C. to 280° C.

* * * * *